United States Patent
Riesselman

[11] Patent Number: 5,996,657
[45] Date of Patent: Dec. 7, 1999

[54] STUMP CUTTER TOOL LIFE EXTENDER

[76] Inventor: Bernard J. Riesselman, 1450 6th Ave. South, South St. Paul, Minn. 55075

[21] Appl. No.: 09/238,997

[22] Filed: Jan. 28, 1999

[51] Int. Cl.⁶ .............................. B27G 13/04; A01G 23/00
[52] U.S. Cl. ........................... 144/235; 37/302; 144/218; 144/334; 241/277; 241/291; 401/101
[58] Field of Search .................... 144/24.12, 218, 144/235, 236, 241, 334; 37/302; 241/188.1, 291, 294, 296, 301, 277; 407/101

[56] References Cited

U.S. PATENT DOCUMENTS

| | | | |
|---|---|---|---|
| 2,992,664 | 7/1961 | De Shano | 144/235 |
| 3,935,887 | 2/1976 | Van Zante et al. | 144/235 |
| 4,561,198 | 12/1985 | Holley | 241/194 |
| 4,759,394 | 7/1988 | Clemenson | 144/235 |
| 4,998,574 | 3/1991 | Beach et al. | 144/241 |
| 5,131,305 | 7/1992 | MacLennan | 83/840 |
| 5,135,035 | 8/1992 | Mills | 144/241 |
| 5,279,345 | 1/1994 | LeMaux et al. | 144/235 |
| 5,623,979 | 4/1997 | Bowling | 144/241 |
| 5,657,803 | 8/1997 | Kappel et al. | 144/24.12 |
| 5,743,314 | 4/1998 | Puch | 144/24.12 |
| 5,893,400 | 4/1999 | Harvey | 144/241 |

*Primary Examiner*—W. Donald Bray
*Attorney, Agent, or Firm*—Jacobson & Johnson

[57] ABSTRACT

A stump cutter having a rotatable disk having a plurality of cutting tool holders with a cutting tool cantilevered therefrom to engage a stump brought into contact with the cutting tool with a protector having a massive leading non-cutting edge that extends sufficiently far outward from the rotatable disk to protect the cutting tool shank and holder from breakage and wear and also reduce whole carbide loss from large rocks to fractional carbide loss.

16 Claims, 4 Drawing Sheets

STUMP CUTTER TOOL LIFE EXTENDER

FIELD OF THE INVENTION

This invention relates generally to stump cutters and more specifically to stump cutter improvements that extend the life of the cutting tools on the stump cutters.

BACKGROUND OF THE INVENTION

The concept of stump cutters is old in the art, typically, a stump cutter has a rotatable cutter disk with sets of cutting tools mounted on each face of the rotatable disk. The rotating disk with the cutting tools, which have hardened or carbide cutting tips, is brought into contact with a stump which causes the carbide cutting tips to abrade away and reduce the stump and stump root system to chips. Typically, the cutting tools are mounted in holders called pockets which enables the cutting tools to be replaced as the cutting tools are worn or broken. Unfortunately, the cutting tools rarely wear out from regular use but more often break there shanks or suffer complete carbide loss or are pulled out of the pocket by rocks and stump roots, which results in a costly and premature replacement of the cutting tool. The protector mounts to the rotatable disk to protect the cutting tool shank and absorb the shocks and impacts from rock and debris, while still providing full used of the carbide cutting tips. Further benefits of the invention included the reduction of wear on the lead tool holder and substantially less rock damage to holder bolt heads, less vibration and an increase in cutting speed. Furthermore, when cutting tools need to be replaced it is easier to replace the cutting tool , particularly the lead cutting tool, as the cutting tool holder and bolts are substantially protected from wear damage that makes it difficult to insert a new cutting tool into the tool holder. The present invention, provides a maintenance friendly cutter wheel having a cutting tool protector that mounts to the rotatable disk with the cutting tool protector including a leading non-cutting edge that projects sufficiently far outward from the rotatable disk to rotationally limit the bite of the subsequent cutting tool, which is located rotationally behind the protector, and thereby substantially eliminate the problems of broken teeth or lost carbide on cutting tools. Other benefits of the invention include the reduction of wear on the lead tool holder, the reduction of vibration and the increase in cutting speed. Furthermore, when cutting teeth need to be replaced it is easier to replace the cutting tool, particularly the lead cutting tool as the cutting tool holder and bolts are substantially protected from the wear damage that makes it difficult to insert a new cutting tool into the tool holder.

DESCRIPTION OF THE PRIOR ART

U.S. Pat. No. 2,992,664 discloses a cutter bit holder.

U.S. Pat. No. 3,935,887 discloses a cutting tool and holder with the cutting tool extending at an angle to the holder.

U.S. Pat. No. 3,759,544 discloses cutting heads with universal bit holders having depth limiting shoulders so that the all of the cutting bits extend uniformly into the bit holders.

U.S. Pat. No. 4,759,394 discloses a stump cutting tool with the cutting teeth positioned at obtuse angles to enable the cutting teeth to slice into the stump.

U.S. Pat. No. 4,998,574 discloses a cutting bit with the cutting bit including a pin retaining recess.

U.S. Pat. No. 5,131,305 discloses a saw tooth and holder therefore.

U.S. Pat. No. 5,135,035 discloses a cutting bit with a circular cross-section.

U.S. Pat. No. 5,279,345 discloses a stump cutter that uses a reinforcing bracket to allow the cutting tool to perform under heavy duty conditions.

U.S. Pat. No. 5,623,979 discloses a one-piece cutting tool for direct mounting to a rotatable cutting wheel.

U.S. Pat. No. 5,657,803 shows a stump cutter with a rotatable wheel carrying cutting tools for cutting or abrading away a stump.

U.S. Pat. No. 5,743,314 discloses a stump cutting tool with an insert attached to the shank.

SUMMARY OF THE INVENTION

A stump cutter rotatable disk having a cutting tool holder with a cutting tool cantilevered therefrom to engage a stump brought into contact with the cutting tool and a protector mounted rotationally ahead of the cutting tool with the protector having a leading non-cutting edge extending sufficiently far outward so as to protect the cutting tool shank and holder from breakage and wear. The protector also changes the angle of impact of larger rocks that would normally cause whole carbide loss thereby causing only fractional carbide loss on the cutting tool. The protector also cuts down on the size of rocks the cutting wheel throws into the chip pile. Generally, the protector causes the larger diameter rocks to be sloughed off to the side of the cutting wheel and pushed backward into the chip pile at a much slower speed.

DESCRIPTION OF THE PREFERRED EMBODIMENT

Figure 1:
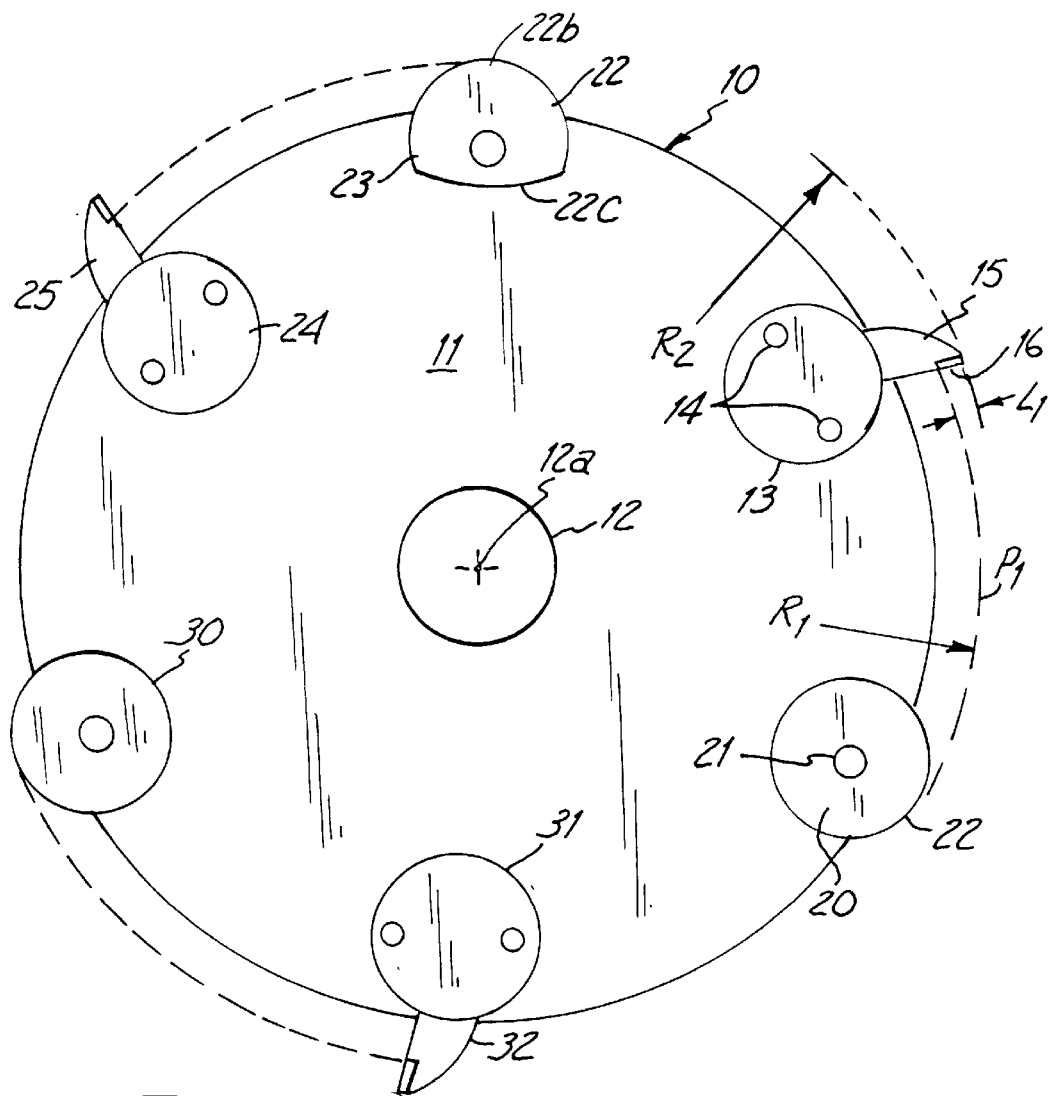
FIG. 1 is a side view of a rotatable cutter wheel having cutting tools with a set of protectors thereon.

FIG. 1 is a side view of a rotatable cutter wheel 10 for a stump cutter with the rotatable cutter wheel 10 having a cutting tool 15 cantilevered outward from cutting tool holder 13. Similarly, cutting tool 32 is cantilevered outward from holder 31, and cutting tool 25 is cantilevered outward from tool holder 24. Also located on cutter wheel 10 are a set of cutting tool protectors 22, 23 and 30. Cutter wheel 10 includes a central opening 12 having a central axis 12a for rotating thereabout.

In the embodiment shown, the cutter wheel 10 includes three cutting tool protectors and three cutting tools. As each of the cutting tools are identical and each of the protectors are identical, only one of each will be described. FIG. 1 shows metal cutting tool 15 mounted in a pocket or metal tool holder 13 which is secured to side 11 of metal cutter wheel 10 by two bolts 14. Cutting tool 15 includes a hardened cutting tip 16, which typically comprises a hardened material such as carbide that is welded to the cutting tool 15. In operation, the cutter wheel rotates in a clockwise direction and the cutting tip 16 extends forward to engage the stump as the rotating cutter wheel 10 is brought into engagement with a stump. By moving the rotating cutting wheel into the stump, the cutting teeth bite into the stump and begin to move in a lateral motion that abrades the stump into wood chips. As can be seen in FIG. 1 the cutting tool 15 is cantilevered outward from the holder 13 and extends a radial distance designated by $R_2$, (where $R_2$ is measured from axis 12a). The length of the cutting tip is indicated by $L_1$.

Located rotationally ahead of cutting tool 15 is protector 20, which is typically made of metal, and which has an annular shape with a peripheral leading non-cutting edge 22. Protector 20 includes a central opening 21 for securing the protector to the cutter wheel 10. In the embodiment shown, the protector 20 is mounted so that a portion of the leading peripheral edge 22 extends beyond the periphery a distance which is indicated by $R_1$ (where $R_1$ is measured from axis 12a). From FIG. 1 it is apparent that the protector 20 extends sufficiently far outward from the cutter wheel 10 so that when the cutter wheel is rotated about the central axis 12a the peripheral leading edge 22 of the protector limits rotational object engagement or the "bite" of the cutting tool 15. In the embodiment shown, the protector 20 is spaced sufficiently far out so that cutting tool bites into an object only to the depth $L_1$ of the hardened cutting tip 16. With traditional stump cutters, no leading protector is provided and the cutter wheel could inadvertently overbite and cause wheel hang-up. I have found that with use of a protector with a massive non-cutting leading edge which is placed ahead of the lead cutting tool a distance denoted by $P_1$, the problem of broken cutting tools is substantially eliminated. That is, the non-cutting leading edge of the protector can be spaced rotationally ahead of the cutting tool to provide protection to the cutting tool. I have found that even with $P_1$ distances of six or seven inches I can still provide protection for the first stage cutter and holder located behind the protector. In operation, the leading peripheral non-cutting edge of protector 20 engages the object being cut and gradually wears away. However, as the protector is cylindrical, I can refresh the protector by rotating the protector to expose a fresh surface of the leading edge. To illustrate this feature, protector 23 is shown with one portion 22a of leading peripheral edge 22 eroded away due to use. By rotating the protector 180 degrees the eroded away section 22c is turned inward leaving a fresh leading peripheral non-cutting edge 22b on the protector 23. By having a massive protector that has a greater mass than the cutting tool and is not cantilevered outward as the cutting tool is, the protector can absorb shocks and impacts through gradual abrasion of the protector while the first stage cutting teeth of a row of cutting teeth can be protected.

Figure 2:
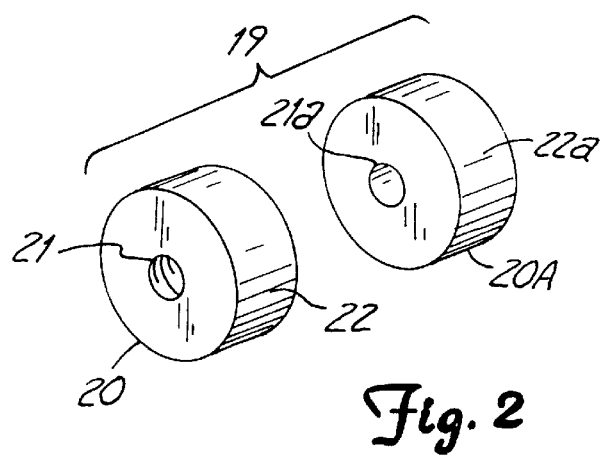
FIG. 2 is a pictorial view of a two-part protector for mounting on opposite sides of the cutter wheel.

FIG. 2 is a pictorial view of a two-part protector 19 for mounting on opposite sides of the cutter wheel 10. Protector 19 is shown with two similar annular parts in order to protect cutting tools on opposite sides of cutter wheel 10 as well as to provide dynamic balance to the cutter wheel 10. Protector 19 comprises a first annular member 20 having a central opening 21 and a peripheral leading edge 22 extending 360 degrees around the outside of protector 21. A second protector 20a is shown having a central opening 21a and a leading edge 22a thereon. In operation of the two-part protector 19, a bolt is extended through one of the protectors and secured to threads in the other protector to hold protector 20 onto one side of cutter wheel 10 and protector 20a on the opposite side of the cutter wheel 10. Protectors 20 and 20a are held sufficiently tight to cutter wheel 11 to normally prevent rotation of the protectors 20 and 20a.

Figure 2A:
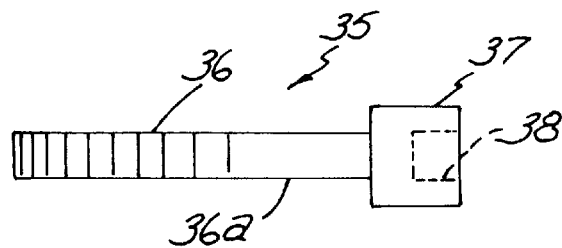
FIG. 2A is a bolt for securing the two-part protector to the cutter wheel.

FIG. 2A shows a bolt 35 for securing the two-part protector to the cutter wheel with the bolt including a threaded section 36, a shank 36a, a head 37 and a socket opening 38 for rotating bolt 35. Bolt 35 has a length that is less than the combined thickness of the protectors and the cutting wheel so that the bolt 35 does not protrude therefrom to thereby eliminate damage to the socket opening 38 which might make it difficult to remove bolt 35 should head 37 become worn from contact with the stumps being cut.

Figure 2B:
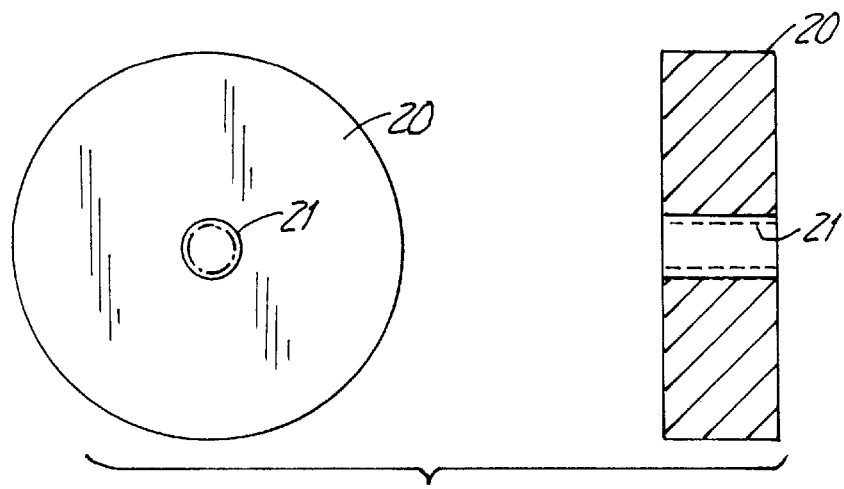
FIG. 2B is a front and side view of one of the two-part protectors that includes a thread section therein.

FIG. 2B is a front and side view of protector 20 of the two-part protector 19 with protector 20 including a central bore that includes a threaded section 21 therein for engagement of threads 36 of bolt 35.

Figure 2C:
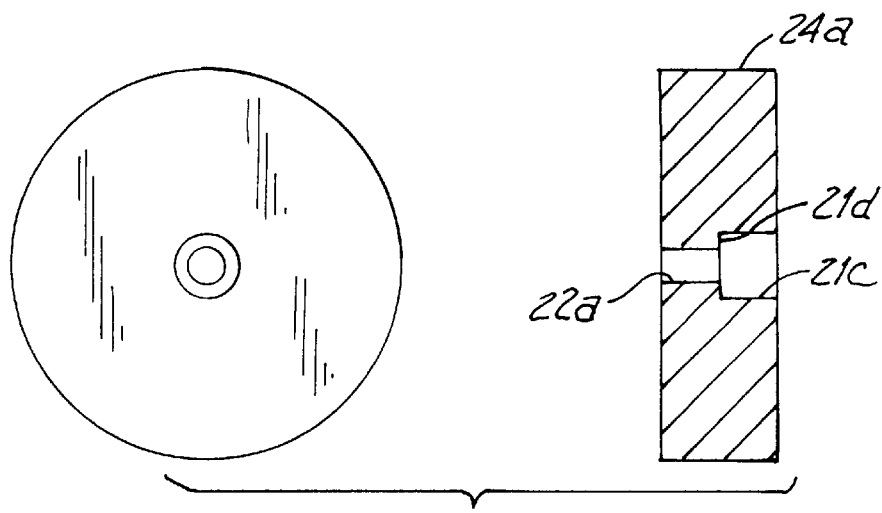
FIG. 2C is a front and side view of the two-part protector that includes a recess for the head of the protector.

FIG. 2C is a front and side view of protector 20a of the two-part protector 19 that includes a central bore 21 a for placing around shank 36a of bolt 35, a shoulder 21d and a cylindrical recess 21c, which is slightly larger than head 37 of bolt 35. That is, bolt head 37 fits inside the recess 21c so that the head of bolt 35 is protected from wear which could make it difficult to remove the bolt 35 if the protector needs to be replaced. While a single bolt is shown, it is envisioned that other fastener members or devices such as double bolts or slotted systems could be used to hold the two-part protector in position.

Figure 3:
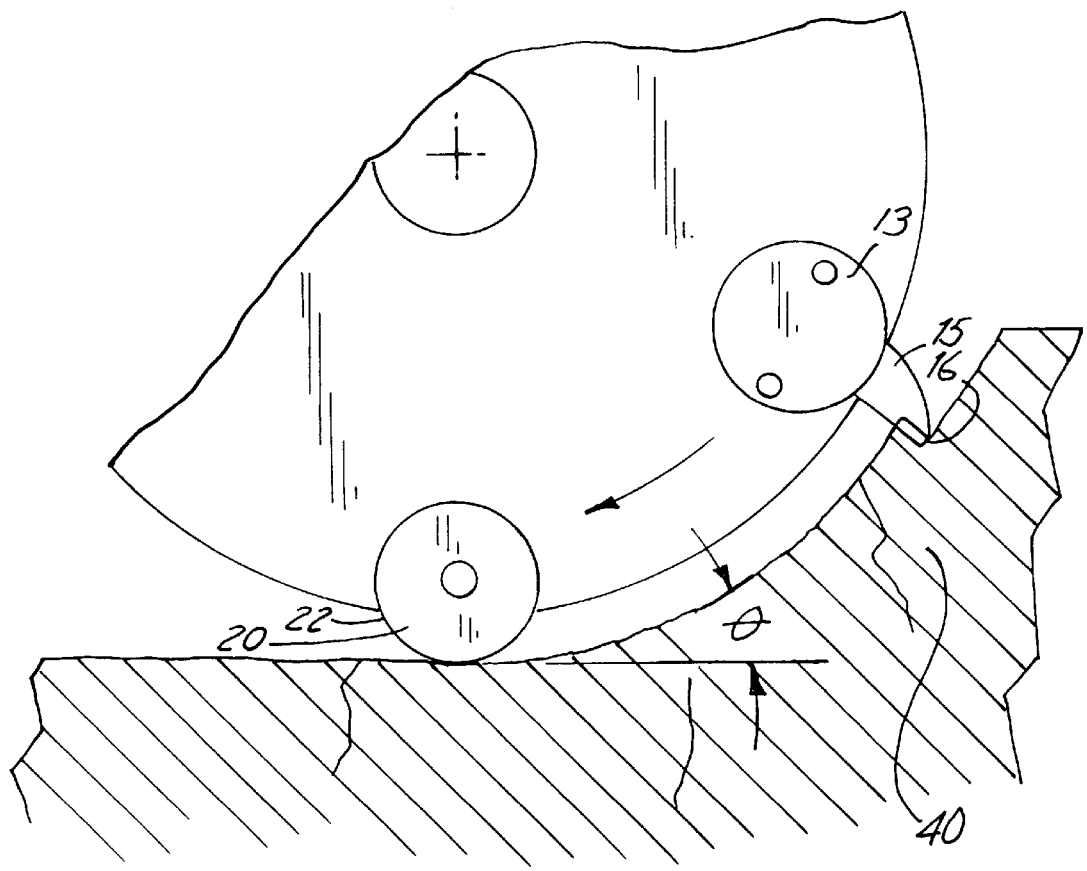
FIG. 3 is a partial side view illustrating the protector and the wake behind the protector.

FIG. 3 is a partial side view illustrating the protector 20 and the angle φ of the trailing wake behind the protector 20. That is the peripheral leading edge of protector engages rock or debris and as a result material is kicked up and disturbed by the action of the protector. As some of the debris is kicked outward and backward from the protector it can engage the cutting tip, however, by placing the protector ahead of the cutting tool so as to limit the bite of the cutting tool, the protector limits the angle of debris kickback which directs debris past the cutting tip 16. I have also found that by directing debris past the cutting tip 16 one helps to minimize the impact of foreign objects such as rocks and the like on the cutting tool thus lengthening the life of the cutting tool. The protector also has the effect of changing the angle of impact of larger rocks that would normally cause whole carbide tip loss thereby causing only fractional carbide tip loss on the cutting tool, which allows the carbide tip to continue cutting. The protector also cuts down on the size of rocks the cutting wheel throws into the chip pile by forcing the larger diameter rocks off to the side of the cutting wheel and pushing them backward into the chip pile at a much slower speed. A further benefit of the invention is that it stops cutter wheel draw-in, which is the tendency of the cutter wheel to rapidly pull its way into the stump. The elimination of cutter wheel draw in greatly reduces the occurrence of cutting wheel hang-up and also greatly reduces the loss of cutting tools due to cutting tool being pull-out of the pocket by having the cutting tool overbite the stump.

Figure 4:
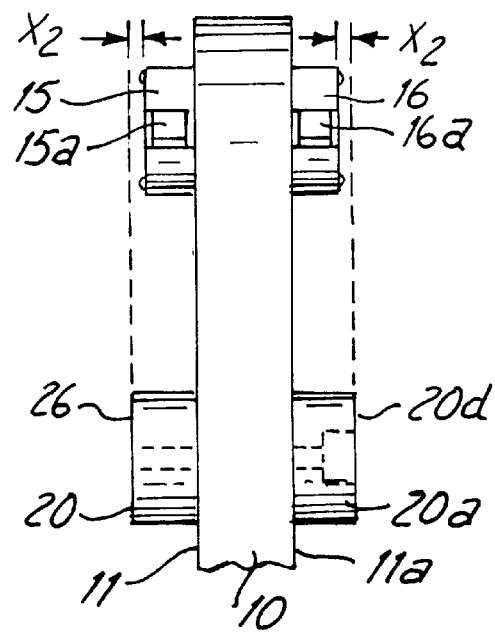
FIG. 4 is a partial end view of a rotatable cutter with cutting teeth and protectors mounted on opposite sides of the cutter wheel.

FIG. 4 is a partial edge view of a rotatable cutting wheel 10 having cutting tools 15 and 16 with respective cutting teeth 15a and 16a cantilevered laterally outward but less than the lateral distance projected by protectors 20 and 20a.

The distance $X_2$ denotes the distance that protector 20 and 20a extend laterally outward from the tip of the cutting tools to provide lateral protection to the cutting tool. However, if desired, the cutting tools 15a and 16a can be set to project outward beyond the protectors 20 and 20a to thereby provide a lateral bite to the cutting tools 15a and 16a. That is, the cutting tip can be mounted to extend laterally beyond the leading lateral surface of the protector. With this alteration the cutting tip would project beyond the protector illustrated in FIG. 1. Consequently, depending on the type of cutting tools to be protected, the user can have a protector with a leading peripheral non-cutting edge or a leading lateral non-cutting surface that extends beyond the cutting tools.

Figure 5:
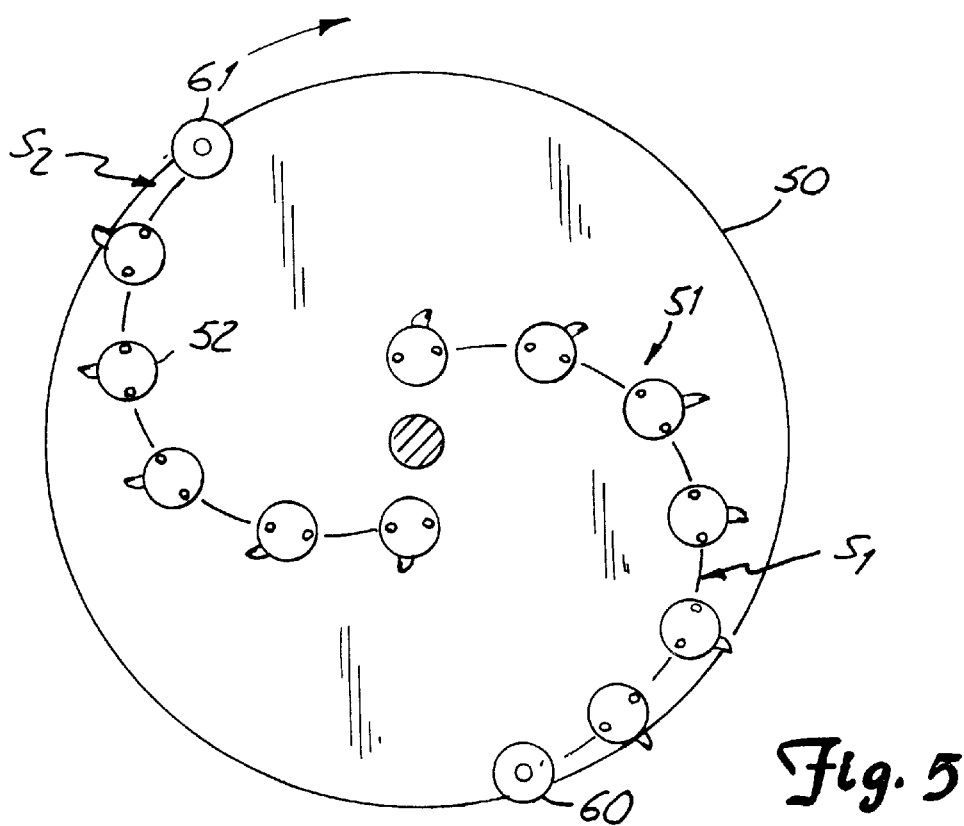
FIG. 5 is a side view of a cutter wheel with the cutting tools mounted in a spiral configuration with the protector rotationally positioned as the leading portion of the spiral configuration cutting heads.

FIG. 5 is a side view of a cutter wheel 50 with one set of cutting tools 51 mounted in a first spiral configuration as indicated by the spiral line $S_1$ and a second set of cutting tools 52 mounted in a second spiral configuration $S_2$. The protector 60 is positioned rotationally as the lead member in the set of cutting tools 51 in spiral configuration $S_1$. Similarly, the protector 61 is positioned rotationally as the lead member in the set of cutting tools 52 in spiral configuration $S_2$. Thus in the embodiment shown the cutting tools 51 are protected from premature breakage by protector 60 and the cutting tools 52 are protected from breakage by the protectors 61.

With the present invention I can reduce the loss of the hardened cutting tips as well as reduce the shank breakage on the cutting tools. A further benefit is that the protector also reduces damage and wear of the holding bracket and both heads of the lead cutting tools. A further benefit is that the massive protector reduces wheel vibration while in the cutting mode as well as throwing less rock. Another benefit is increased distance between lead cutting tools making possible a more aggressive cut without increasing cutting tool shank breakage and whole carbide loss.

I claim:

1. A cutter wheel for a stump cutter, said cutter wheel having a first side and a second side;
    a first pocket mounted on said first side of said cutter wheel and a second pocket mounted on said second side of said cutter wheel with each of said pockets carrying a cutting tool with a cutting tip thereon;
    each of said cutting tips of said cutting tools projecting outward from the respective pocket to thereby enable the cutting tip to cut an object brought into contact with the cutting tip as the cutter wheel is rotated about a central axis;
    a protector mounted on said cutter wheel, said protector having a leading edge, said leading edge projecting sufficiently far outward from said cutter wheel so that when the cutter wheel is rotated about the central axis the protector limits the depth of object engagement with the cutting tool to thereby extend the life of the cutting tool.

2. The cutter wheel of claim 1 including a second cutting tool and a second protector for the second cutting tool located on an opposite side of said cutting wheel to rotationally protect said second cutting tool.

3. The cutter wheel of claim 1 wherein the protector includes a peripheral leading non-cutting edge that can be rotated to provide a fresh surface for engaging debris.

4. The cutter wheel of claim 3 including a lateral projecting surface to protect the cutting tool.

5. The cutter wheel of claim 4 wherein the protector has an annular configuration with a central threaded opening.

6. The cutter wheel of claim 1 wherein the protector includes a bolt for securing the protector to the cutter wheel.

7. The cutter wheel of claim 1 wherein the protector is metal.

8. The cutter wheel of claim 1 including at least two spiral configurations of cutting tools mounted thereon with each of the spiral configuration of cutting tools having a protector as a leading member in the spiral configuration of cutting tools.

9. The cutter wheel of claim 1 including a second protector located on the second side of the cutter wheel with the second protector and the first protector held in position by a bolt extending through one of the protectors and threadingly engaging the other protector with the bolt recessed within said protectors so as not erode as the protectors erode.

10. A stump cutter wheel, said cutter wheel having a first side and a second side;
    a pocket mounted on said first side of said cutter wheel with said pocket carrying a cutting tool with a cutting tip thereon;
    said cutting tip of said cutting tool cantilevered outward from the pocket to thereby enable the cutting tip to cut an object brought into contact with the cutting tip as the cutter wheel is rotated about a central axis;
    a protector mounted on said cutter wheel, said protector having a leading non-cutting edge, said leading non-cutting edge projecting sufficiently far outward from said cutter wheel so that when the cutter wheel is rotated about the central axis the leading non-cutting edge limits object engagement with the cutting tool to thereby extend the life of the cutting tool.

11. A cutting tool protector, said cutting tool protector comprising a member having a non-cutting leading edge for engaging a stump to be abraded away, said non-cutting leading edge including a fastener for securing said tool protector in a circumferential position ahead of a cutting tool on a stump cutting wheel.

12. The cutting tool protector of claim 11 wherein the cutting tool protector has an annular shape with a peripheral non-cutting edge that can be rotated to a work position when a portion of the peripheral non-cutting edge becomes worn from use.

13. The cutting tool protector of claim 11 wherein the fastener comprises a bolt and the cutting tool protector includes a threaded section for engagement with the bolt.

14. The cutting tool protector of claim 11 wherein the cutting tool protector comprises metal.

15. The cutting tool protector of claim 11 wherein the cutting tool protector has a peripheral non-cutting leading edge that has an arcuate shape.

16. The cutting tool protector of claim 11 wherein the cutting tool protector is located as a lead member to a set of cutting tools.

* * * * *